US005430589A

United States Patent [19]
Moir et al.

[11] Patent Number: 5,430,589
[45] Date of Patent: Jul. 4, 1995

[54] COMPUTER DISK DRIVE UNIT HAVING VIBRATION ABSORBING ISOLATOR DISPOSED BETWEEN THE HOUSING COVER AND THE MEMORY STORAGE UNIT

[75] Inventors: Michael B. Moir; Khosrow Mohajerani, both of Newbury Park; Richard G. Krum, Thousand Oaks, all of Calif.

[73] Assignee: Seagate Technology, Inc., Scotts Valley, Calif.

[21] Appl. No.: 237,252

[22] Filed: May 2, 1994

[51] Int. Cl.$^6$ .................................... G11B 33/14
[52] U.S. Cl. .................. 360/97.02; 360/98.07; 360/99.08
[58] Field of Search ............. 360/97.02, 97.01, 98.07, 360/99.08

[56] References Cited
U.S. PATENT DOCUMENTS 4,879,617  11/1989  Sampietro et al. .
4,905,110   2/1990  Krum et al. .
4,965,686  10/1990  Young et al. ............... 360/98.07
4,985,792   1/1991  Moir .

Primary Examiner—A. J. Heinz
Attorney, Agent, or Firm—Kelly, Bauersfeld & Lowry

[57] ABSTRACT

A computer disk drive unit includes a housing having a lower base and an upper removable cover which define a disk storage compartment therebetween. A shaft fixed to the lower base supports a plurality of memory storage disks for rotation within the disk storage compartment. An elastomeric snubber extends between an upper end of the shaft and the upper housing cover, for preventing direct contact and absorbing vibration between the shaft and the upper housing cover. The snubber is a cylindrical member having a lower solid section disposed within a recess in the upper end of the shaft, and an upper tubular section which is compressed as the upper housing cover is secured to the lower base. The upper housing cover includes a thickened portion whereat the upper tubular section of the snubber contacts the cover.

11 Claims, 1 Drawing Sheet

5,430,589

COMPUTER DISK DRIVE UNIT HAVING VIBRATION ABSORBING ISOLATOR DISPOSED BETWEEN THE HOUSING COVER AND THE MEMORY STORAGE UNIT

BACKGROUND OF THE INVENTION

This invention relates generally to improvements in computer disk drives. More particularly, the present invention relates to a computer disk drive unit having an isolator disposed between a cover for the housing and a memory storage unit within the housing, for preventing direct contact and absorbing vibration between the housing cover and the memory storage unit.

In recent years microcomputer equipment, particularly personal and desk top computers, have become extremely popular for a wide variety of home, business and commercial uses. Such computers commonly include a main central processor unit having one or more memory storage disks. In many modern computers, the storage disk or disks, sometimes refer to as "hard disks," are provided as part of a Winchester-type disk drive unit having the storage disks supported in a stack on a rotary spindle within a substantially sealed disk drive housing. The disks are rotatably driven in unison by a small spindle motor, and one or more electromagnetic heads on a movable positioning arm are displaced by a precision stepper motor to traverse surfaces of the rotating disks for purposes of reading and writing data. Such Winchester-type disk drive units are generally preferred in comparison with so-called floppy type disk drives due to their higher memory storage capacities and faster operating speeds.

With the steadily increasing popularity of personal-sized computers, various standard computer components have evolved to accommodate installation into computers produced by different manufacturers and/or to ensure compatibility with commercially available software. In this regard, Winchester-type disk drive units having one or more memory storage disks of an approximate 5.25 inch diameter have been manufactured and used on an industry-wide basis. More recently, smaller and lighter Winchester-type disk drives having storage disks of about 3.74 inches in diameter have become available. For either diametric size, the disk drive units have been produced in standardized vertical profile sizes to permit installation into a computer as an original equipment item, or as an after-market item to replace or upgrade an original disk drive unit. Disk drive units have been manufactured with a vertical dimension of about 3.25 inches to fit within a so-called "full height" vertical spacing, or with a vertical dimension of about 1.625 inches to fit within a so-called "half height" profile.

Typically, such computer disk drive units include a housing having a lower base and an upper removable cover which, collectively, define a disk storage compartment therebetween. A shaft is fixed to the lower base and extends upwardly therefrom toward the upper housing cover, and one or more memory storage disks are mounted for rotation within the disk storage compartment about the shaft. The shaft and the memory storage disks comprise a memory storage unit which, with other related components situated within the disk storage compartment, are manufactured to very precise manufacturing specifications in order to, in many instances, maximize the memory storage capabilities of the disk drive unit.

The upper housing cover is usually quite thin and, under certain circumstances, capable of flexing inwardly and outwardly relative to the disk storage compartment. This can be a problem in an operating environment if inward flexion of the cover causes the cover to contact a moving component of the memory storage unit within the disk storage compartment. One solution, as illustrated in U.S. Pat. No. 4,905,110, the contents of which are incorporated herein by reference, has been to secure the cover directly to a shaft of the spindle motor in order to attempt to eliminate movement of the cover relative to the rotating memory storage disks, and thereby prevent contact. One disadvantage to this approach, however, is that sometimes undesirable vibration occurs between the cover the shaft.

Accordingly, there has been a need for a novel computer disk drive unit wherein direct contact between the shaft and the upper housing cover is prevented. Moreover, such a disk drive unit is needed wherein relative vibration between the shaft and the upper housing cover is absorbed. Such an improved disk drive unit must utilize, to the extend possible, standard housing and memory storage unit components, and lend itself to economical manufacturing processes and techniques. The present invention fulfills these needs and provides other related advantages.

SUMMARY OF THE INVENTION

The present invention resides in an improved computer disk drive unit which isolates the cover of a disk drive housing from internal components. More particularly, in Winchester-type disk drive units, a spindle motor is typically provided for rotatably driving one or more memory storage disks. The housing of the disk drive unit usually comprises a lower base an an upper removable cover, which collectively define a disk storage compartment therebetween. A shaft is fixed to the lower base and extends upwardly therefrom toward the upper housing cover, and one or more memory storage disks are mounted for rotation within the disk storage compartment about the shaft. The upper housing cover is typically very thin and, under certain conditions, flexion of the upper housing cover may cause it to undesirably contact a rotatable component within the disk storage compartment, or vibrate against the shaft.

In accordance with the present invention, an elastomeric snubber is provided between the shaft and the upper housing cover, for preventing direct contact and for absorbing relative vibration between the shaft and the upper housing cover. The snubber comprises a cylindrical member having a lower solid section disposed within a recess in an upper end of the shaft, and an upper tubular section which engages a thickened portion of the upper housing cover.

The elastomeric snubber is configured and positioned within the recess of the shaft so as to be compressed when the cover is attached to the lower base of the housing. The elastomeric snubber effectively and efficiently eliminates vibration between the upper housing cover and the shaft.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
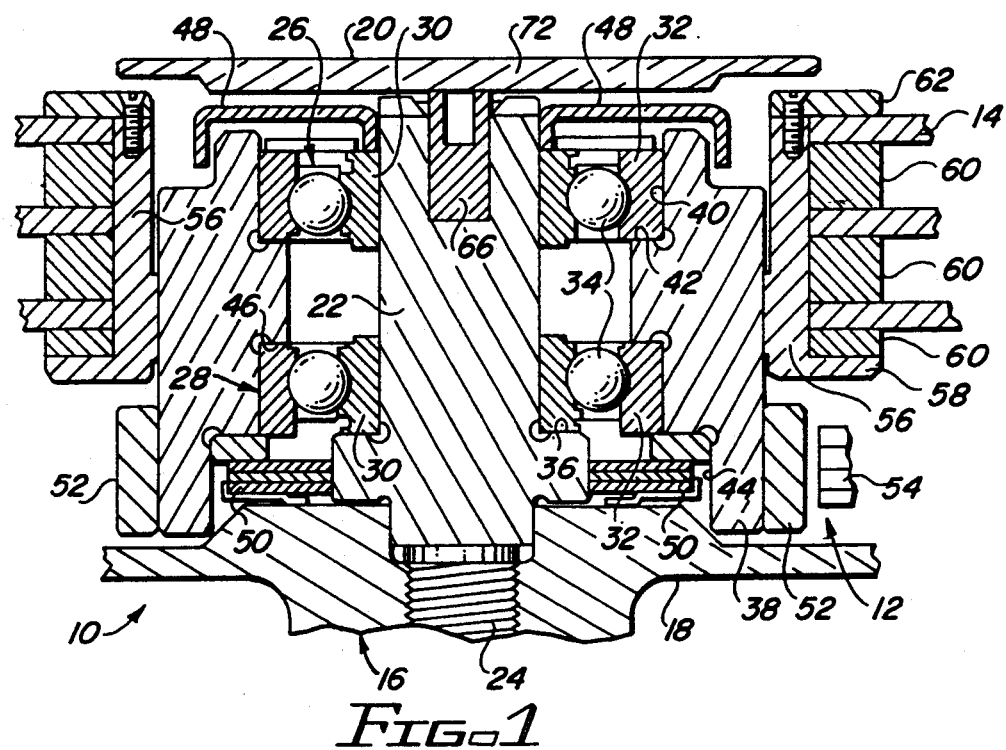
FIG. 1 is a fragmented elevational sectional view through a computer disk drive unit embodying the present invention, illustrating an elastomeric snubber situated within a recess of a shaft and extending upwardly into contact with a cover for a housing of the disk drive unit.

As shown in the drawings for purposes of illustration, the present invention is concerned with an improved computer disk drive unit, generally designated in the accompanying drawings by the reference number 10. The disk drive unit 10 includes a spindle motor 12 for rotatably driving a stack of memory storage disks 14 arranged to fit within the vertical profile available to the disk drive unit 10.

The disk drive unit 10 comprises a so-called "hard" disk drive of the general type used in modern personal computers and the like. The disk drive unit 10 conventionally includes a substantially sealed housing 16 defined by a rigid lower base 18 and a removable, flexible upper housing cover 20. The housing 16 has an overall size and shape with generally standardized external dimensions selected to fit within a limited installation envelope within a cabinet (not shown) for a central processor unit of a computer.

As is generally known in the art, the illustrative disk drive unit 10 includes a head positioner assembly (not shown) mounted within the housing 16 at a position alongside the disk stack. The head positioner assembly supports a plurality of individual arms having electromagnetic heads (not shown) at the distal ends thereof in close proximity with respective upper and lower surfaces on the disks 14. A suitable actuator motor such as a movable coil DC motor, and a corresponding motor controller function to displace the heads through generally radial traverses relative to the disks 14 for purposes of reading and writing data, all in a well known manner.

With reference to FIG. 1, a central shaft 22 is securely fixed to a portion of the housing lower base 16, and the memory storage disks 14 are mounted for rotational movement within the housing 16 about the shaft 22. The shaft 22 includes a lower threaded end 24 that, typically, passes through the housing lower base 18 and is secured in place, for example, by means of a threaded nut (not shown).

The shaft 22 is formed by machining or the like to accommodate predetermined positional mounting of upper and lower bearing units 26 and 28. More specifically, the two bearing units 26 and 28 comprise a pair of precision ball bearing units each having an annular inner race 30 cooperating with an annular outer race 32 to contain an annular array of bearing balls 34 therebetween. The upper bearing unit 26 is positioned adjacent to an upper end of the shaft 22, and the lower bearing unit 28 is positioned in a downward spaced relation to the upper bearing unit 26 toward a position with its inner race 30 seated against an axially upwardly presented shoulder stop 36 on the shaft 22.

The outer races 32 of the two bearing units 26 and 28 rotatably support a generally cylindrical hub core 38 constituting the rotor of the spindle motor 12. The outer race 32 of the upper bearing unit 26 is secured directly within an upper bore 40 of the hub core in seated relation against a shoulder stop 42. Similarly, the outer race 32 of the lower bearing unit 28 is secured directly within a lower bore 44 of the hub core 38 in seated relation against a shoulder stop 46.

The rotary interfaces between the shaft 22 and the hub core 38 are sealed to prevent migration of bearing contaminants or the like into contact with the memory storage disks 14. Although the specific structure of the requisite sealing means may vary, a conventional labyrinth seal 48 is utilized adjacent to the upper bearing unit 26, and a conventional exclusion ferro-fluid seal unit 50 is utilized adjacent to the lower bearing unit 28.

The hub core 38 supports, at its lower end, a plurality of permanent magnets 52 which interact with an electromagnetic stator core 54 to rotate the hub core 38 about the shaft 22 in a known manner. The hub core 38 also supports an outer disk supporting hub 56, which supports the stack of storage disks 14 for rotation within the disk drive housing 16. In this regard, the disks 14 are stacked upon a lower outer support flange 58 of the supporting hub 56. The disks 14 are separated from each other by intervening spacer rings 60 of precision height, thereby orienting the disks 14 in a precision spacing for access therebetween of the various heads discussed previously. An upper clamp ring or member 62 is fastened onto the upper end of the outer disk supporting hub 56 by a plurality of screws or the like (not shown) to compress the stack of disks 14 and related spacer rings 60. Accordingly, when the hub core 38 is driven during motor operation, the group of disks 14 are rotated as a collective unit.

In accordance with the present invention, an upper end of the shaft 22 is provided a recess 64 into which an elastomeric snubber 66 is placed. The snubber 66 is preferably made of Vamac ethylene acrylic elastomer, and comprises a cylindrical member having a lower solid section 68 and an upper tubular section 70. The upper end of the tubular section 70 of the snubber 66 bears against an undersurface of a thickened portion 72 of the upper housing cover 20, and serves to prevent direct contact between the shaft 22 and the upper housing cover 20, as well as absorb relative vibration therebetween.

Figure 2:
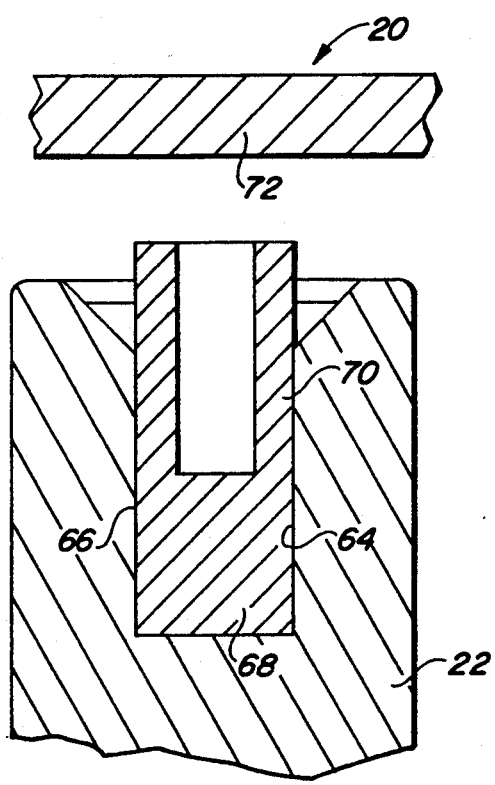
FIG. 2 is an enlarged, fragmented sectional view taken generally of the area indicated by the arrow 2 in FIG. 1, illustrating, in greater detail, the configuration of the elastomeric snubber within the recess of the shaft when the cover is removed.

With reference to FIGS. 1 and 2, the snubber 66 is designed to be compressed as the housing cover 20 is secured to the rigid lower base 18 of the housing 16. By way of example, in the preferred embodiment the snubber 66 has a length of 0.190 inch. The recess 64, however, extends within the shaft from the upper tip thereof, only 0.170 inch. Thus, there is a 0.020 inch portion of the tubular section 70 of the snubber 66 which, before compression by the cover 20, extends upwardly from the upper end of the shaft 22 (see FIG. 2). When the upper cover 20 is secured to the rigid lower base 18 of the housing 16, and without any inward or outward flexion of the cover 20, the cover is normally spaced 0.007 inch from the upper end of the shaft 22. Thus the tubular section 70 of the snubber 66 is compressed 0.013 inch as the cover 20 is secured to the lower base 18 of the housing 16.

From the foregoing it will be appreciated that compression of the snubber 66 within the recess 64 of the shaft 22 advantageously permits the snubber to absorb vibration between the cover 20 and the shaft 22 while simultaneously preventing contact between the cover and rotating components within the housing 16 due to flexion of the cover inwardly into the housing 16. Additionally, the improved computer disk drive unit 10, constructed as described above, largely utilizes standard disk drive components in a usual manner, thus minimizing any increased costs associated with the present invention.

Although a particular embodiment of the invention has been described in detail for purposes of illustration, various modifications may be made without departing from the spirit and scope of the invention. Accordingly, the invention is not to be limited, except as by the appended claims.

What is claimed is:

1. A computer disk drive unit, comprising:
   a housing having a lower base and an upper cover which define a disk storage compartment therebetween;
   a shaft secured relative to the lower base and extending upwardly therefrom toward the upper housing cover;
   a memory storage disk mounted for rotation within the disk storage compartment about the shaft; and
   elastic isolator means extending between the shaft and the upper housing cover, for preventing direct contact and absorbing vibration between the shaft and the upper housing cover.

2. The computer disk drive unit of claim 1, wherein the elastic isolator means includes an elastomeric snubber.

3. The computer disk drive unit of claim 2, wherein the shaft includes a recess in an upper end thereof, and the snubber extends from within the recess upwardly into contact with the upper housing cover.

4. The computer disk drive unit of claim 3, wherein the upper housing cover includes a thickened portion whereat the snubber contacts the upper housing cover.

5. The computer disk drive unit of claim 2, wherein the snubber comprises a cylindrical member having a lower solid section and an upper tubular section.

6. A computer disk drive unit, comprising:
   a housing having a cover and a disk storage compartment;
   a memory storage unit rotatably positioned within the disk storage compartment, the memory storage unit includes a shaft fixed to a portion of the housing other than the housing cover, and a memory storage disk mounted for rotation within the disk storage compartment about the shaft; and
   an elastomeric isolator extending between and abutting both the housing cover and the shaft, for absorbing vibration between the housing cover and the memory storage unit.

7. The computer disk drive unit of claim 6, wherein the isolator comprises an elastomeric snubber placed so as to prevent direct contact between the housing cover and the memory storage unit.

8. The computer disk drive unit of claim 6, wherein the shaft includes a recess in an end thereof adjacent to the housing cover, and wherein the isolator extends from the recess into contact with the housing cover.

9. The computer disk drive unit of claim 8, wherein the housing cover includes a thickened portion whereat the isolator contacts the housing cover.

10. The computer disk drive unit of claim 9, wherein the isolator comprises a cylindrical member having a lower solid section disposed within the recess, and an upper tubular section which engages the housing cover.

11. A computer disk drive unit, comprising:
    a housing having a lower base and an upper removable cover which define a disk storage compartment therebetween, the upper housing cover including a thickened portion;
    a shaft fixed to the lower base and extending upwardly toward the upper housing cover, the shaft including a recess in an upper end thereof;
    a memory storage disk mounted for rotation within the disk storage compartment about the shaft; and
    an elastomeric snubber extending from within the recess upwardly into contact with the thickened portion of the upper housing cover, for preventing direct contact and absorbing vibration between the shaft and the upper housing cover, the snubber comprising a cylindrical member having a lower solid section disposed within the recess, and an upper tubular section adjacent to the upper housing cover.

* * * * *